Jan. 19, 1971  J. R. HENSLEY  3,556,616
SAFETY DEVICE FOR FLUID ACTUATED ASSEMBLIES
Filed July 31, 1969
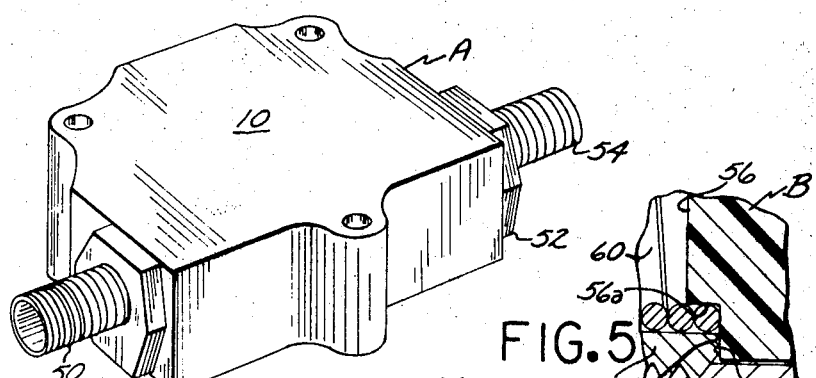
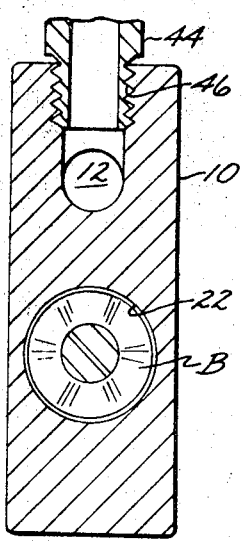
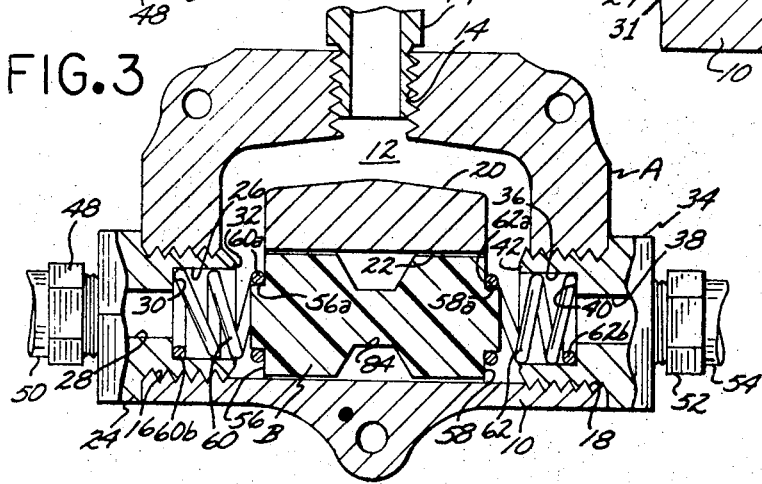
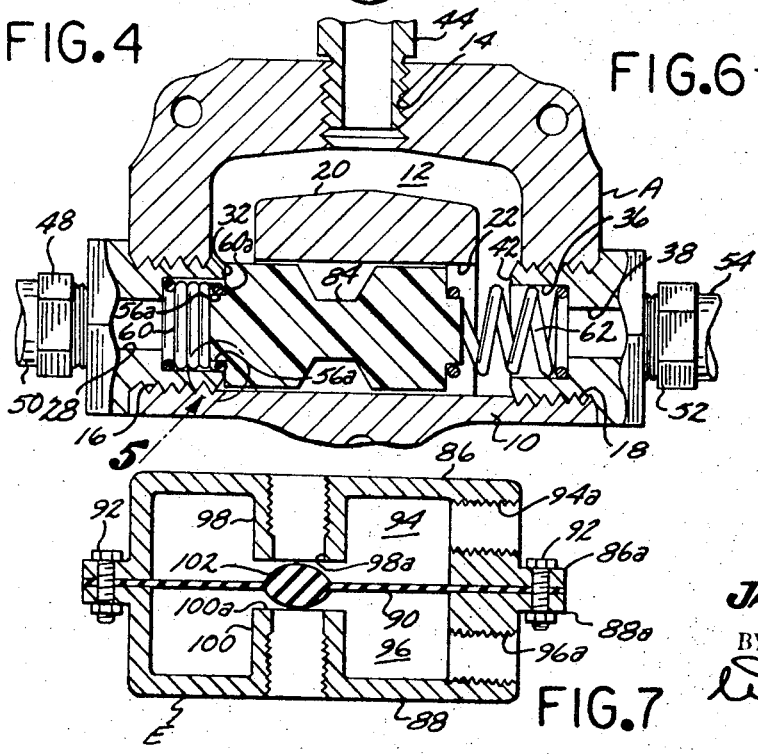
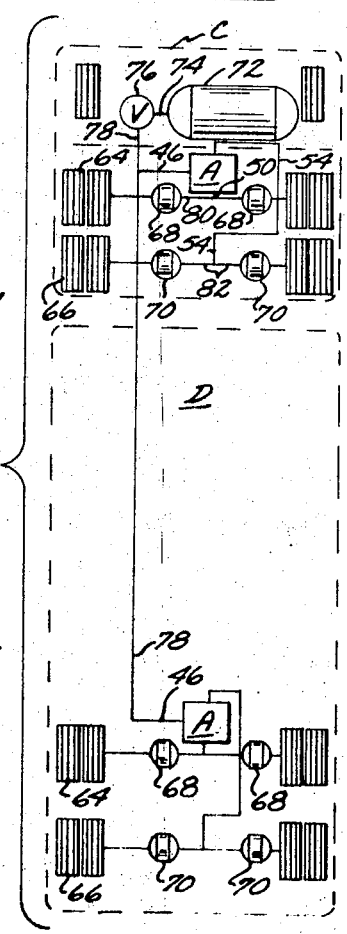
INVENTOR.
JAMES R. HENSLEY
BY
William C. Babcock
ATTORNEY United States Patent Office 3,556,616
Patented Jan. 19, 1971

3,556,616
SAFETY DEVICE FOR FLUID ACTUATED ASSEMBLIES
James R. Hensley, 510 Euclid, Compton, Calif. 90222
Filed July 31, 1969, Ser. No. 846,433
Int. Cl. B60t *17/18, 15/00*
U.S. Cl. 303—84                    2 Claims

ABSTRACT OF THE DISCLOSURE

A safety device for use with two concurrently operable fluid actuated assemblies by means of which one of said assemblies may be operated after the other of said assemblies has been rendered inoperative due to development of a leak in the assembly or the conduit leading thereto. The safety device is particularly adapted for use with fluid actuated brake assemblies.

BACKGROUND OF THE INVENTION

Field of the invention

A safety device for use with two concurrently operable fluid actuated assemblies, such as automotive brakes, or the like, to permit continuous operation of one assembly after the other assembly has been rendered inoperative caused by the development of a leak therein or in the conduit leading thereto.

Description of the prior art

In the automotive field, both hydraulic fluid and air operated brakes are widely used. Whether by hydraulic fluid or air operated, the brakes are selectively energized by fluid from a common source. A serious operational disadvantage of fluid operated brakes is that all of the brakes are rendered inoperative when a leak develops in one of the conduits leading to a brake assembly.

Various safety devices have been designed and used in the past to a limited extent in an attempt to minimize this hazard, but heretofore they have not proven to be satisfactory, and as a result, have not come into widespread use. The present invention solves the above-mentioned problem in a simple and easy manner, and eliminates the possibility that a driver of an automotive vehicle may find himself without braking power should one of the conduits leading to a brake assembly fail.

SUMMARY OF THE INVENTION

A safety device in the form of a valve that is interposed between the conduits leading to automotive fluid actuated brake assemblies and the source of pressurized fluid. Fluid in the valve of the present invention maintains an equal pressure on opposite sides of a valve member forming a part thereof so long as the brake assemblies and conduits leading thereto are free of leaks. However, in the event one of the conduits or brake assemblies develops a leak, an unbalanced fluid pressure condition is immediately set up in the valve, whereby a valve member in the valve is immediately moved to a positon where it prevents further flow of fluid to the conduit or brake assembly from which fluid is leaking. After the valve member has so moved, it permits that portion of the fluid actuated brake assemblies in which no leaks have occurred to be used for braking purposes.

A major object of the present invention is to provide an inexpensive safety device of simple structure to be interposed between a plurality of fluid actuated assemblies and a source of fluid under pressure to permit a portion of the assemblies to be actuated after one of the assemblies has been rendered inoperative either due to development of a leak therein, or in a conduit leading thereto.

Another object of the invention is to provide a safety device in which the driver of an automotive vehicle retains some braking power, even if a portion of the fluid actuated brakes on his vehicle are rendered inoperative should a leak develop in a conduit leading thereto.

A still further object of the invention is to furnish a safety device that may be easily and quickly adjusted to any desired sensitivity to prevent actuation of said safety device in the event a minor leak of fluid from a brake system should occur.

Yet another object of the invention is to provide a safety device that is entirely automatic in operation, requires little or no maintenance attention, can be installed for equally effective results on either new or old automotive vehicles, and one which, due to the low cost thereof, is within the financial reach of practically any owner or user of automotive vehicles.

BRIEF DESCRIPTION OF THE DRAWING

FIG. 1 is a perspective view of a first form of the safety device;

FIG. 2 is a transverse cross-sectional view of the device, taken on the line 2—2 of FIG. 1;

FIG. 3 is a longitudinal cross-sectional view of the device, taken on the line 3—3 of FIG. 1, with the valve member shown in a nonobstructing position;

FIG. 4 is the same longitudinal cross-sectional view shown in FIG. 1, but with the valve member being in a first position to obstruct discharge of fluid through a first valve seat and first passage associated therewith;

FIG. 5 is an enlarged fragmenary, cross-sectional view of the device within the circle shown in phantom line in FIG. 4;

FIG. 6 is a diagrammatic view of a tractor and trailer drawn thereby, illustrating the manner in which the safety devices are incorporated into the fluid actuated brake system thereon; and FIG. 7 is a longitudinal cross-sectional view of a second form of the safety device.

DESCRIPTION OF THE PREFERRED EMBODIMENTS

The first form A of the safety device includes a multipiece valve body 10, the structural details of which are best seen in FIGS. 1–5 inclusive. Body 10 includes an interior confined space 12 that is in communication with a tapped fluid inlet opening 14, and first and second longitudinally aligned tapped openings 16 and 18 formed in the body.

Body 10 also includes a portion 20 that extends into confined space 12 and is situated between openings 16 and 18. A bore 22 extends longitudinally through body portion 20, and is in axial alignment with openings 16 and 18. First tapped opening 16 is engaged by a first threaded plug 24 in which a longitudinal bore 26 and counterbore 28 are formed, and which at the junction thereof define a circular body shoulder 30. The interior end portion of first plug 24 defines a valve seat 32 that is in communication with bore 26.

Second tapped opening 18 is engaged by a second threaded plug 34 in which a longitudinal bore 36 and counterbore 38 are formed, and at the junction of which bore and counterbore a circular body shoulder 40 is defined. The interior end portion of second plug 34 defines a valve seat 42. The valve seats 32 and 42 both have a number of circular radially spaced serrations 31 formed thereon of transverse V-shaped cross section as may best be seen in FIG. 5. Fluid inlet opening 14 is engaged by a suitable threaded fitting 44 that is connected to a conduit 46 through which fluid under pressure is supplied to confined space 12. The outer end of first plug 24 is engaged by a conventional fitting 48 that is connected to a first conduit 50, as shown in FIG. 3. Likewise, the outer end of second plug 34 is engaged by a conventional fitting 52 that is connected to a second conduit 54.

An elongate valve member B is slidably mounted in bore 22. Valve member B is preferably formed from nylon or other inert plastic material that does not deteriorate when subjected to a hydraulic fluid over a prolonged period of time, and one which will not stick or bind when in contact with the valve portion 20.

Valve member B has first and second end surfaces 56 and 58 in which circular recesses 56a and 58a, respectively, are formed.

First and second helical springs 60 and 62 are provided, and the ends 60a and 62a thereof engage first and second recesses 56a and 58a, as shown in FIG. 3. The ends 60b and 62b of the springs abut against body shoulders 30 and 40.

The springs 60 and 62 tend at all times to maintain valve member B at an intermediate position between valve seats 32 and 42 whereby fluid in confined space 12 or when entering said space, is free to flow through valve seats 32 or 42 to the first or second conduits 50 or 54 that are in communication therewith.

The first form A of the safety device is simple to use and install. In FIG. 6 of the accompanying drawing, two of the safety devices A are shown installed on a tractor C and trailer D. Both the tractor C and trailer D are provided with first and second sets of rear wheels 64 and 66, and first and second air operated brake assemblies 68 and 70 associated therewith. A tank 72 of compressed air is mounted on tractor C from which a discharge line 74 extends to a normally closed valve 76, and from which a header 78 extends. One of the safety devices A is provided for the tractor C and a second of the devices for the trailer D. Both of the safety devices A are connected to the header 78 by conduits 46.

A first conduit 50 leads from safety device A installed in tractor C to a conduit 80 that extends to brake assemblies 68. The second conduit 54 connected to the safety device A in the tractor C extends to a conduit 82 that proceeds to the brake assemblies 70.

Should a leak develop in the conduits 50 or 80 or brake assemblies 68 of tractor C, air discharged under pressure into the safety device A by actuation of valve 76 will flow from the confined space 12 through counterbores 28 and 38 at different rates. This differential in rate of flow from confined space 12 creates a differential in pressure on the first and second end surfaces 56 and 58 of valve member B. The differential in pressure on the end surfaces 56 and 58 causes valve member B to move to the left as viewed in FIG. 3 and seal with seat 32, due to the serrations 31 pressure engaging one end of the valve member B. The serrations 31 are metal and are of course harder than the plastic defining the valve member B, and when the valve member is in pressure contact with the serrations a fluid tight seal is effected therewith. The valve member B serves not only this function, but as a sealing member as well, due to the serrations 31 being harder than the plastic defining the valve member. Thus, no resilient O-rings or pads are required to effect a fluid tight seal when the valve member B is in pressure contact with seats 32 or 42. The position of valve member B after completing the movement to the left is shown in FIG. 4. Further flow of air from the confined space 12 to the conduits 50, 80 and brake assemblies 68 is now obstructed, but with the brake assemblies 70 remaining operable.

The sensitivity of the first form A of the safety device illustrated in FIGS. 1–6, inclusive, in being actuated to obstruct air flow through either conduits 50 or 54 is controlled by the degree of resiliency of springs 60 and 62. If the leak in the conduits 50 or 80, or brake assemblies 68 is of a minor character, the resiliency of springs 60 and 62 will prevent the small differential in pressure on the end surfaces 56 and 58 of valve member B from moving the valve member to a fluid obstruction position. The safety device A on trailer D operates in the same manner as the safety device A above described.

When air is used as the actuating fluid as above described, the valve member B will remain in the obstructing position shown in FIG. 4 so long as the valve 76 is in an open position. When valve 76 is placed in a closed position, the air in the brake assemblies 68 and 70 by means not shown is vented to the atmosphere, and springs 60 and 62 return valve member B to the nonobstructing position illustrated in FIG. 3. If the brake assemblies 68 and 70 are actuated by hydraulic fluid, the valve member B will remain in a fluid obstructing position, shown in FIG. 4, after being moved thereto. The valve member B must be returned to the normal position shown in FIG. 3 after the leak in the conduits or brake assemblies have been repaired.

Valve member B may be formed from "Lexan," a polycarbonate resin manufactured and distributed by General Electric Company. If desired, valve member B may have a circular recess 84 formed in the center thereof.

A second form E of safety device is shown in FIG. 7 that serves the same purpose as first form A of the device. Safety device E includes two identical half valve bodies 86 and 88 that have flanges 86a and 88a projecting therefrom that are in abutting contact with a resilient diaphragm 90. Flanges 86a and 88a are held in abutting sealing contact with diaphragm 90 by bolts 92.

Half valve bodies 86 and 88 cooperate with diaphragm 90 to define two compartments 94 and 96 that are in communication with two fluid inlets 94a and 96a preferably formed in the ends of the valve bodies. Two tapped, transversely aligned, tubular members 98 and 100 extend inwardly from the side walls of the half valve members 86 and 88, as shown in FIG. 7. Spaced valve seats 98a and 100a are defined on the inner ends of valve members 98 and 100.

Fluid inlets 94a and 96a, by a suitable fitting (not shown), are connected to conduit 46. The tapped tubular members 98 and 100 are connected to conduits 50 and 54. Diaphragm 90 includes a thickened valve member 102 that is transversely aligned with seats 98a and 100a but spaced therefrom.

Second form E of the safety device has fluid supplied to the compartments 94 and 96 at equal pressure through inlets 94a and 96a, and the fluid discharges from the compartments through the members 98 and 100. Upon development of a leak in one of the conduits 50 or 54, fluid escapes from one of the members 98 or 100 at a more rapid rate than from the other. This variance in the rate of fluid discharge causes an unbalanced pressure condition in the compartments 94 and 96, and valve member 102 is forced into sealing engagement with the seat 98a or 100a that is in communication with the conduit in which a leak has developed.

The second form E of the safety device, like the first form A, may be used on either pneumatically or hydraulically operated brake systems.

I claim:

1. In combination with a pressurized fluid supply line and first and second fluid actuated brake assemblies having first and second conduits extending therefrom, a safety device for permitting one of said assemblies to operate when the other thereof has become incapacitated by a leak developing therein or in said conduit extending therefrom, said device including:
    (a) a valve body that defines a confined space that is in communication with first and second axially aligned tapped bores, said body having a third bore therein that is normally disposed to said first and second bores and is in communication with said confined space, and a portion of said body that extends into said confined space and has a fourth elongate bore therein that is longitudinally aligned with said first and second tapped bores;

(b) first and second externally threaded plugs of identical structure that threadedly engage said first and second tapped bores, said plugs on their inner adjacent ends defining annulus shaped valve seats on which a plurality of circular radially spaced serrations of V-shaped transverse cross section are defined, said plugs having longitudinal bores and counter bores extending therethrough which at their junctions define ring shaped body shoulders;

(c) a single elongate generally cylindrical valve member formed from a polymerized resin that is not effected by brake fluid, said valve member slidably mounted in said longitudinal bore, said valve member of less length than the distance between said valve seats, said valve member having flat end surfaces that effect a fluid tight seal with said serrations when forced into pressure contact therewith;

(d) two axially aligned helical springs disposed in said confined space, said springs of less diameter than the diameter of said valve member, said springs having first ends thereof in abutting contact with said seats and second ends thereof in contact with the ends of said valve members;

(e) first means for controlling the flow of fluid through said supply line;

(f) second means connecting said supply line to said third bore; and (g) third means connecting said first and second conduits to said bores and counter bores in said plugs, said springs so long as there is no substantial leak in one of said brake assemblies or in said conduits maintaining said valve member in a centered position in said confined space where fluid can flow from said supply line to said conduits, but upon a leak developing in one of said conduits or brake assemblies an unbalanced pressure develops in said fluid in said confined space that forces said valve member to move in a direction to pressure contact said valve seat associated with said conduit or brake assembly in which said leak has developed and seal with said seat to prevent loss of fluid from said confined space.

2. A safety device as defined in claim 1 in which said resin defining said valve member is a polycarbonate resin.

References Cited

UNITED STATES PATENTS

| 870,806 | 11/1907 | Turner | 303—84(A) |
|---|---|---|---|
| 1,870,484 | 8/1932 | Basta | 303—84(A)UX |
| 2,992,652 | 7/1961 | Fellberg | 303—84(A)X |
| 3,148,693 | 9/1964 | Jones et al. | 303—84(A)X |
| 3,473,851 | 10/1969 | Neves | 188—151(11)X |

FOREIGN PATENTS

| 1,113,797 | 12/1955 | France | 303—84(A) |

GEORGE E. A. HALVOSA, Primary Examiner

J. J. McLAUGHLIN, Jr., Assistant Examiner

U.S. Cl. X.R.

137—118; 188—151